US011204705B2

(12) United States Patent
Sun et al.

(10) Patent No.: US 11,204,705 B2
(45) Date of Patent: Dec. 21, 2021

(54) RETENTION-AWARE DATA TIERING ALGORITHM FOR HYBRID STORAGE ARRAYS

(71) Applicant: Western Digital Technologies, Inc., San Jose, CA (US)

(72) Inventors: Chao Sun, San Jose, CA (US); Pi-Feng Chiu, Milpitas, CA (US); Dejan Vucinic, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 121 days.

(21) Appl. No.: 16/293,393

(22) Filed: Mar. 5, 2019

(65) Prior Publication Data
US 2020/0285391 A1  Sep. 10, 2020

(51) Int. Cl.
*G06F 3/06* (2006.01)
*G06F 12/02* (2006.01)
*G06N 20/00* (2019.01)

(52) U.S. Cl.
CPC ............ *G06F 3/064* (2013.01); *G06F 3/0619* (2013.01); *G06F 3/0647* (2013.01); *G06F 3/0685* (2013.01); *G06F 12/0246* (2013.01); *G06N 20/00* (2019.01); *G06F 2212/7211* (2013.01)

(58) Field of Classification Search
CPC .... G06F 3/064; G06F 3/0647; G06F 12/0246; G06F 3/0685; G06F 2212/7211; G06F 3/0619; G06N 20/00
USPC ......................................................... 707/687
See application file for complete search history.

(56) References Cited

U.S. PATENT DOCUMENTS

| 8,010,738 | B1 | 8/2011 | Chilton et al. |
| 8,380,915 | B2* | 2/2013 | Wood .................... G11C 29/026 |
| | | | 711/100 |
| 8,700,839 | B2 | 4/2014 | Chang et al. |
| 8,805,806 | B2 | 8/2014 | Amarendran et al. |
| 8,959,286 | B2 | 2/2015 | Bell, Jr. et al. |
| 9,569,120 | B2 | 2/2017 | Ryan et al. |
| 9,619,381 | B2 | 4/2017 | Camp et al. |
| 9,792,071 | B2 | 10/2017 | Gorobets et al. |
| 9,811,288 | B1* | 11/2017 | Chen ..................... G06F 3/0685 |
| 2011/0299317 | A1* | 12/2011 | Shaeffer ............. G11C 13/0035 |
| | | | 365/106 |

(Continued)

FOREIGN PATENT DOCUMENTS

| CN | 104731523 A | 6/2015 |
| WO | WO 2015109128 A1 | 7/2015 |

OTHER PUBLICATIONS

International Search Report for PCT Application PCT/US2019/64301, dated Apr. 5, 2020.

(Continued)

*Primary Examiner* — Kuen S Lu
(74) *Attorney, Agent, or Firm* — Patent Law Works LLP

(57) ABSTRACT

A memory array controller includes memory media scanning logic to sample a bit error rate of memory blocks of a first memory device. A data management logic may then move data from the first memory device to a second memory device if the bit error rate matches a threshold level. The threshold level is derived from a configurable data retention time parameter for the first memory device. The configurable data retention time parameter may be received from a user or determined utilizing various known machine learning techniques.

20 Claims, 6 Drawing Sheets

(56) References Cited

U.S. PATENT DOCUMENTS

| | | | |
|---|---|---|---|
| 2015/0117107 A1* | 4/2015 | Sun | G11C 16/225 |
| | | | 365/185.12 |
| 2015/0178191 A1* | 6/2015 | Camp | G06F 12/0246 |
| | | | 711/103 |
| 2017/0199680 A1 | 7/2017 | Li | |
| 2019/0384829 A1* | 12/2019 | P | G06F 16/113 |

OTHER PUBLICATIONS

Pan, Y., Dong, G., & Zhang, T. (2012). Error rate-based wear-leveling for NAND flash memory at highly scaled technology nodes. IEEE Transactions on Very Large Scale Integration (VLSI) Systems, 21(7), 1350-1354. Pan, Y., Dong, G., & Zhang, T. Jul. 31, 2013 (Jul. 31, 2013), Entire document.

Written Opinion of the ISA for PCT Application PCT/US2019/64301, dated Apr. 6, 2020.

* cited by examiner

RETENTION-AWARE DATA TIERING ALGORITHM FOR HYBRID STORAGE ARRAYS

BACKGROUND

Conventional non-volatile memories may be solid-state memory cells, such as FLASH memory, resistive random access memory (RRAM), spin-torque transfer random access memory (STRAM), phase change random access memory (PCRAM), etc. These and other types of memory cells may utilize a semiconductor construction and store data in relation to programmed electrical, mechanical and/or structural aspects of the cells. In many types of non-volatile memories, the cells of the memory storage array are organized into memory blocks.

A variety of real world effects, such as read disturb errors, write disturb errors, charge drift, temperature degradation, demagnetization, accumulated write/erasure cycles, wear, etc., may affect the programmed integrity of a memory block over time. A retention rate for a memory block may be characterized as the rate at which the data retention time of the memory block declines. While newer solid-state non-volatile memories may be specified to retain data for a characteristic period of time (e.g., five years, etc.), as a memory nears the end of its operational life, the memory may have a significantly degraded data retention time (e.g., three months, etc.).

In conventional memory devices, such as solid state drives, the controller may take proactive steps to mitigate reductions in performance resulting from the above effects. For example, if a memory block exhibits a relatively high number of correctable errors during readback operations, the memory block may be retired from service (de-allocated) before the memory block degrades to the point where it provides uncorrectable errors with continued use.

Hybrid storage arrays may include a hybrid all-FLASH array (AFA), including single level cell (SLC), multi-level cell (MLC), triple-level cell (TLC), quad-level cell (QLC), in one or more combinations, hybrid storage class memory (SCM) and NAND flash solid state drive (SSD) arrays, hybrid NAND flash SSD and hard disk drive (HDD) arrays, etc. In these hybrid storage arrays, some memory devices may be configured to transfer data with high performance (e.g., configured for speed), while other memory devices may be configured for slower, more reliable storage (e.g., degrade to uncorrectable errors more slowly). Conventional tiering algorithms including Least Recently Used (LRU) and its variants, bloom filter and its variant, monitoring systems, etc., store hot, warm, and cold data in fast, medium, and slow media, respectively.

BRIEF SUMMARY

Conventional background processes utilized in storage systems may be leveraged for determining data temperature and memory block bit error rates, which may then be utilized to determine the most suitable storage media for particular data. Embodiments of a retention-aware data tiering system is disclosed to more efficiently determine the data temperature and bit error rate of data stored in one or more memory devices and transfer the data to the memory device configured to more efficiently store or transfer such data.

The system utilizes a configurable data retention time parameter to determine a data temperature for data stored in a first memory device. The configurable data retention time parameter may be correlated to a bit error rate threshold level. An integrity scan leveraging background processes in the system determines the bit error rate of the data stored in a first memory device. Data management logic determines whether to transfer the data in the first memory device to a second memory device based on the bit error rate and the bit error rate threshold level.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are embodiments of a retention aware data management logic for a hybrid storage system, which may automatically assign hot data (i.e., active data) and cold data (i.e., less active data) among different memory devices. A hybrid storage system refers to a storage system that comprises multiple types of memory, each type of memory being optimized for different performance parameters. High speed memory is typically more expensive than lower speed memory options, so a smaller, high speed solid state drive might be pared with a larger but slower solid state drive or hard disk drive to provide a single memory solution that provides enough storage at a reasonable speed and price. The data management logic may influence the distribution of the hot data and the cold data as part of a larger data management scheme. The hybrid storage system may characterize what constitutes active data by utilizing a tuned data retention time parameter configured by a user, e.g., via a control interface on a host device.

In one embodiment a final determination of the data temperature is made based on the output of a wear leveling algorithm, the data retention time parameter, and/or characteristics of NAND flash itself. Wear leveling refers to a process by which a memory array controller prevents physical memory cells from experiencing excessive wear compared to other cells due to excessive use. The memory array controller has the capability to detect which memory blocks are being accessed most frequently and to move the static (cold) data in those blocks periodically to infrequently accessed memory blocks such that the amount of wear experienced due to frequent access is spread out or leveled across the memory storage array. Data temperature is a characterization of how frequently data stored in a memory storage array is accessed, i.e., how active the data is. Data temperature may be categorized in multiple ways. For example, "hot data" may be data accessed frequently within a specified time window; "warm data" may be accessed less frequently; and "cold data" may accessed infrequently. Data temperature may be measured by a static wear leveling algorithm and determined through comparison to a specified bit error rate threshold level. When the bit error rate of particular memory block(s) or of a particular memory device, as measured by the wear leveling logic, matches the configured threshold, and/or the data retention time parameter, the data in the particular block(s) is determined to be static data (cold data), regardless of the actual read/write activity on the block.

Figure 1:
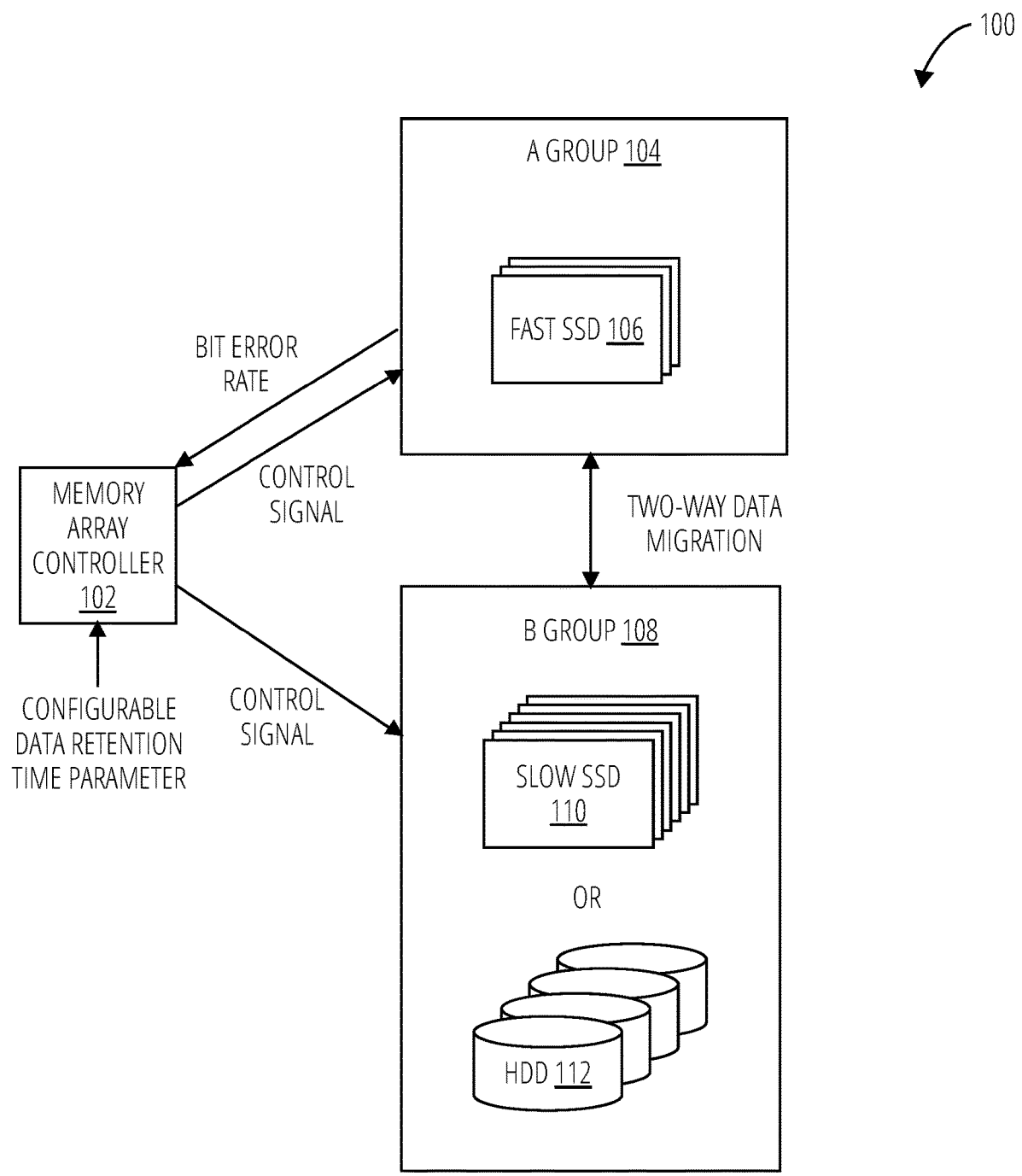
FIG. 1 illustrates a hybrid storage system 100 in accordance with one embodiment.

Referring to FIG. 1, a hybrid storage system 100 comprises a memory array controller 102, an A group memory storage array 104, and a B group memory storage array 108. The A group memory storage array 104 further comprises a fast solid state drive 106. The B group memory storage array 108 further comprises a slower solid state drive 110 and/or a hard disk drive 112. For optimal performance, data that is frequently accessed may be stored in speed-optimized A group memory storage array 104 within the hybrid storage system 100. Data in memory blocks of the A group memory storage array 104 that exhibit a high bit error rate due to long periods of retention may be moved to the slower (higher latency) but higher capacity, and possibly more reliable, memory blocks of the B group memory storage array 108.

The bit error rate is determined by many factors such as data retention errors, program disturb errors, and read disturb errors. In some embodiments, the retention time of data may be the primary triggering factor for overruling a hot data determination and migrating data from the A group to the B group. Due to wear cycle error the bit error rate on the A group memory storage array 104 may reach the threshold level before the configured configurable data retention time parameter for the A group data. In this case, the A group data may be migrated to the B group before the configured retention time is reached.

The memory array controller 102 may utilize retention aware data management logic. A scanning or scrubbing procedure (e.g., wear leveling logic) may be executed in the background (e.g., periodically) to evaluate the integrity of blocks and pages within the A group memory storage array 104. When memory media scanning logic is executed, bit errors may trigger a process for wear leveling. Data in memory blocks exhibiting a higher bit error rate may be migrated from one set of blocks to another. A data temperature may be determined for example based on a bit error rate for blocks in the A group memory storage array 104 by a wear leveling algorithm without requiring the maintenance overhead of an additional management data structure. When the bit error rate of a memory block increases above a threshold based on a data retention time parameter, or when the age of a memory block in the A group memory storage array 104 ages past the time set by the data retention time parameter, the data in the memory block at issue is identified as static data, which is analogous to being cold data.

The memory array controller 102 may utilize memory media scanning logic to periodically sample a bit error rate of particular memory blocks in a first memory device, such as the fast solid state drive 106 of the A group memory storage array 104. The data management logic of the memory array controller 102 may send a control signal to migrate data, and/or redirect data writes from the first memory device (e.g., the fast solid state drive 106 of the A group memory storage array 104) to a second memory device (e.g., the slower solid state drive 110 or the hard disk drive 112 of the B group memory storage array 108) if the bit error rate of data stored in the first memory device exceeds a threshold level.

The threshold level may be derived from a configurable data retention time parameter for the first memory device. The configurable data retention time parameter may be received as a user input, an input from a machine learning component utilizing machine learning techniques known in the art, etc. The machine learning component may, for example, be supervised or semi-supervised. The configurable data retention time parameter may be correlated to a bit error rate threshold level. Such a correlation may be performed by mapping. For example, the memory array controller 102 (or other component) may store a lookup table (LUT) to correlate configurable data retention time parameters to bit error rate threshold levels.

If the configurable data retention time parameter exceed a storage retention time limitation of the memory device, the higher value may be used.

The memory array controller 102 may have a dynamic random-access memory (DRAM) as well as an optional cache, the optional cache and a data buffer, the optional cache, the data buffer, and a logical-to-physical (L2P) mapping table. Utilizing known techniques for data management, the memory array controller 102 may also send a control signal to the B group memory storage array 108 to migrate data from the B group memory storage array 108 to the A group memory storage array 104 based on the data temperature of the data stored in the B group memory storage array 108 (e.g., the data gets "hot").

The A group memory storage array 104 may be a high speed NAND-type FLASH memory storage array with media parameters optimized for speed (i.e., the fast solid state drive 106). The B group memory storage array 108 may be a slower NAND-type FLASH memory array (i.e., the slower solid state drive 110), a hard disk drive (i.e., the hard disk drive 112), or some other type of memory with media parameters optimized for storage capacity. Media parameters refers to properties inherent in the physical media of the memory storage array. This includes number of blocks on a die, number of pages in a block, page size, bits per cell, program/erase latencies, etc. For example, for a hybrid storage system 100 that utilizes the fast solid state drive 106 and the slower solid state drive 110, the fast solid state drive 106 may utilize single level cell technology (SLC), while the slower solid state drive 110 may utilize multi-level cell technology (MLC). For a hybrid storage system 100 that utilizes the fast solid state drive 106 and the hard disk drive 112, the fast solid state drive 106 may be an SLC or MLC and the slower memory device is a hard disk drive 112.

Figure 5:
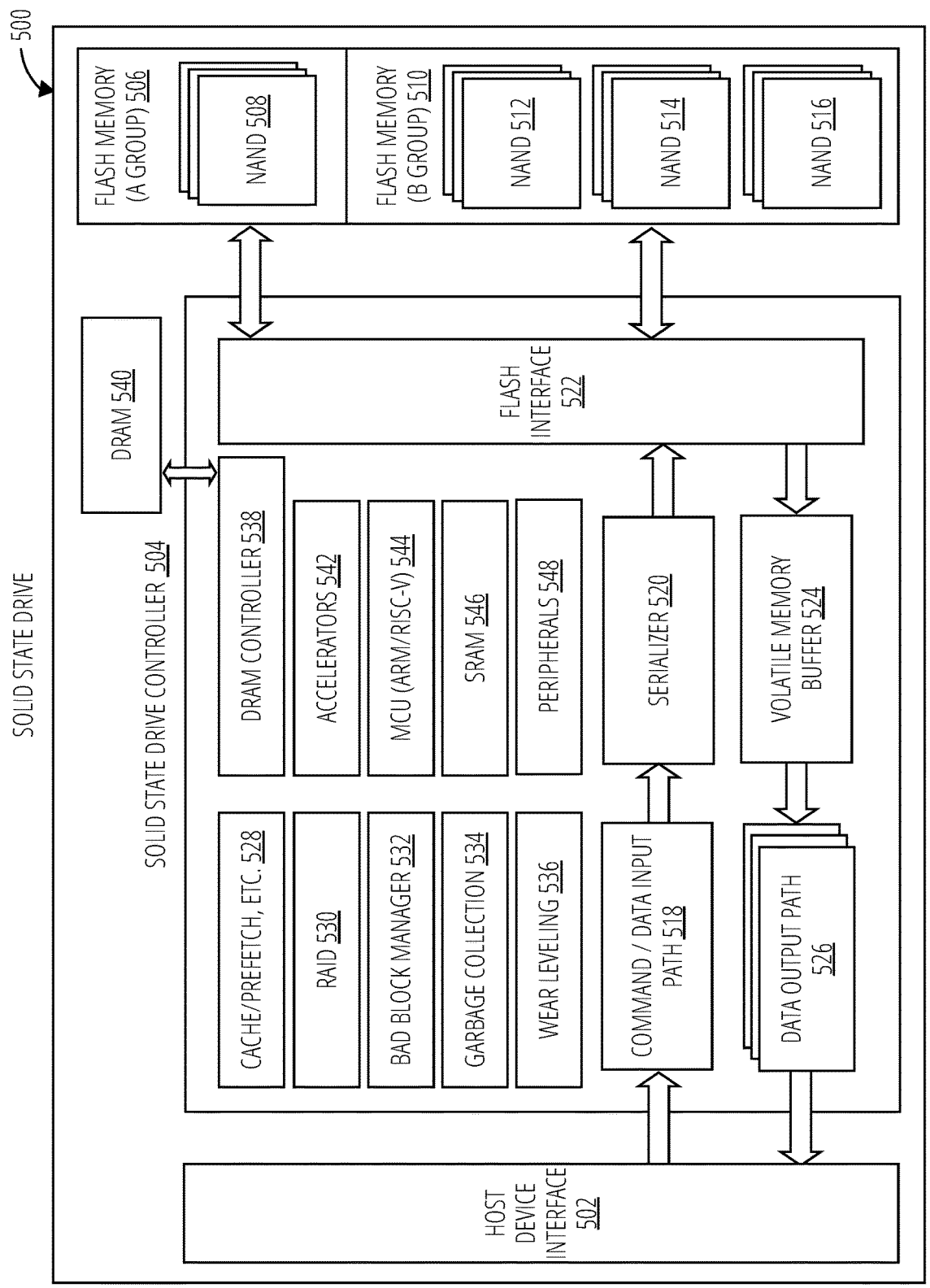
FIG. 5 illustrates a solid state drive 500 in accordance with one embodiment.
Figure 6:
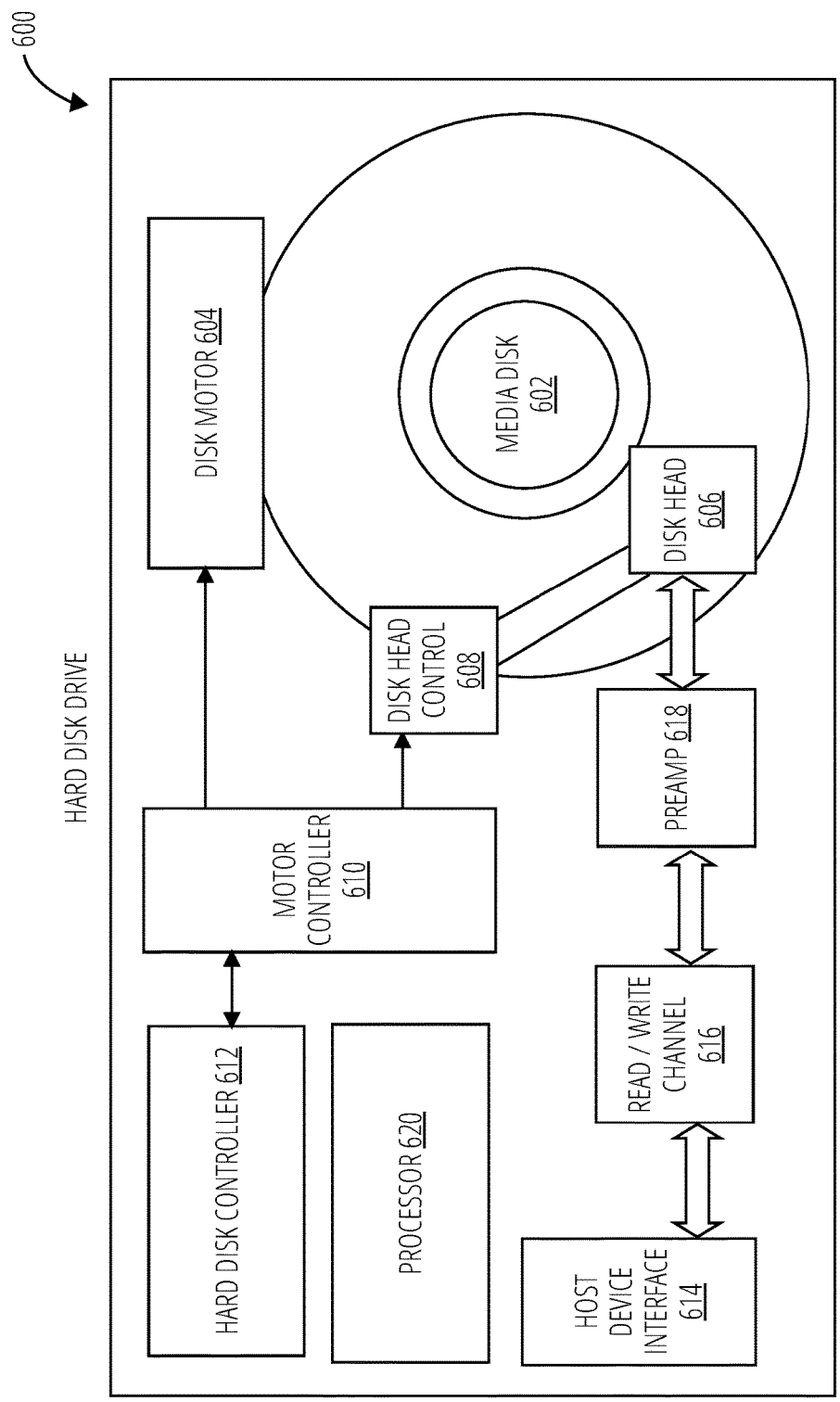
FIG. 6 illustrates a hard disk drive 600 in accordance with one embodiment.

Data stored in the A group memory storage array 104 and the B group memory storage array 108 may be transferred to the other group. That is, the A group memory storage array 104 and the B group memory storage array 108 may have two-way data migration. Conventional techniques may be utilized to manage this two-way data transfer. The transfer, as well as the initial storage, may be based on the data temperature of the data to be stored. The proportion of memory capacity of the A group memory storage array 104 to the B group memory storage array 108 may be determined during manufacture. For example, the hybrid storage system 100 may be 30% A group memory storage array 104 and 70% B group memory storage array 108. An exemplary fast solid state drive 106 or slower solid state drive 110 is depicted in FIG. 5. An exemplary hard disk drive 112 is depicted in FIG. 6.

In one embodiment of the hybrid storage system 100, the memory array controller 102 utilizes a central controller for global data management/optimization, while each drive (the fast solid state drive 106, the slower solid state drive 110, or the hard disk drive 112) has a "thin" controller (simplified circuitry compared to the central controller). In this embodiment, the thin controllers have access to internal media characteristics, such as retention parameters, garbage collection function, etc. Depending on the internal media characteristics being optimized and how much information the thin controller may send to the central controller, the central controller may know or partly know the internal status of each drive. With this first embodiment, the thin controllers may indicate whether data is cold based on the data retention time parameter and/or bit error rate as determined by wear leveling, and the central controller may perform data migration based on this determination. This may lead to additional communication overhead.

In another embodiment, the memory array controller 102 comprises one or more central controllers for all media in the array. In this embodiment, the central controller may deep optimize the media operations without the intermediate management layers. In further embodiments, double controllers may exist for resilience or other purposes. For example, a "Guardian" architecture may adopt this second embodiment. The central controller may receive the media retention parameters, perform the wear leveling, etc., and thus reduce communication overhead.

In yet another variation, the thin local controllers of the memory devices perform wear leveling logic and report the bit error rate to the one or more central controllers which then make the determination of whether data in the A group is static and should be migrated to the B group.

The data retention time parameter may be set by a user operating the host device and provided to the hybrid storage system 100 over a host device interface, to be utilized as a criterion for moving data from the A group memory storage array 104 to the B group memory storage array 108. The user may select a time period to determine a threshold at which hot data becomes cold data, regardless of or in conjunction with the bit error rate reported by the wear leveling logic. Data in the A group memory storage array 104 with a lower data retention time may be moved to the B group memory storage array 108 sooner than data in the A group memory storage array 104 exhibiting the same bit error rate but having a higher data retention time. Thus, the memory blocks of the A group memory storage array 104 may be freed up faster for new, hot data. Data with higher data retention time, on the other hand, may be maintained in the A group memory storage array 104 longer than data with a lower data retention time. Thus, this data may take longer to be classified as cold data.

A user setting for the threshold level at which data is considered cold data may be one of a number of criteria used to migrate data from one part of memory to another. If the user-set parameter results in an overuse of A group memory storage array 104, other criteria may be triggered, such as least recently used (LRU), to free up space in the A group memory storage array 104 by moving the LRU data to the B group memory storage array 108. A notification may be posted to the host device accessing the memory to alert the user to this condition and suggest an adjustment of the configurable data retention time parameter(s).

Additionally, too much data may be written to the A group memory storage array 104 in a short time period. This may be due to unexpected workload characteristic change or due to an improper global parameter setting. As a result, the A group memory storage array 104 becomes full of data. At this point or at a prior pre-determined threshold, a conventional eviction/tiering algorithm may be deployed/utilized. This conventional eviction/tiering algorithm may move data from the A group memory storage array 104 to the B group memory storage array 108.

Figure 2:
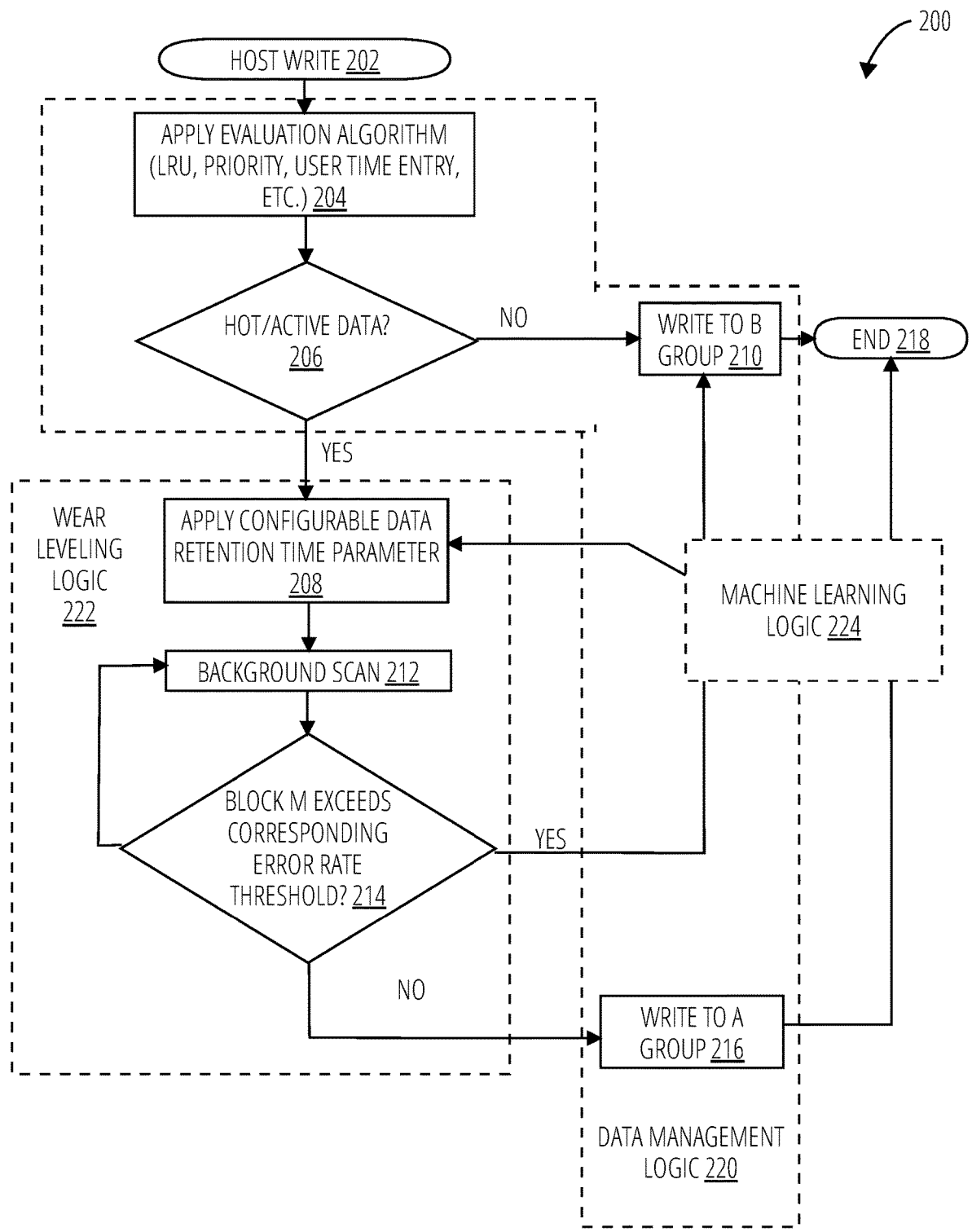
FIG. 2 illustrates a memory migration process 200 in accordance with one embodiment.
Figure 3:
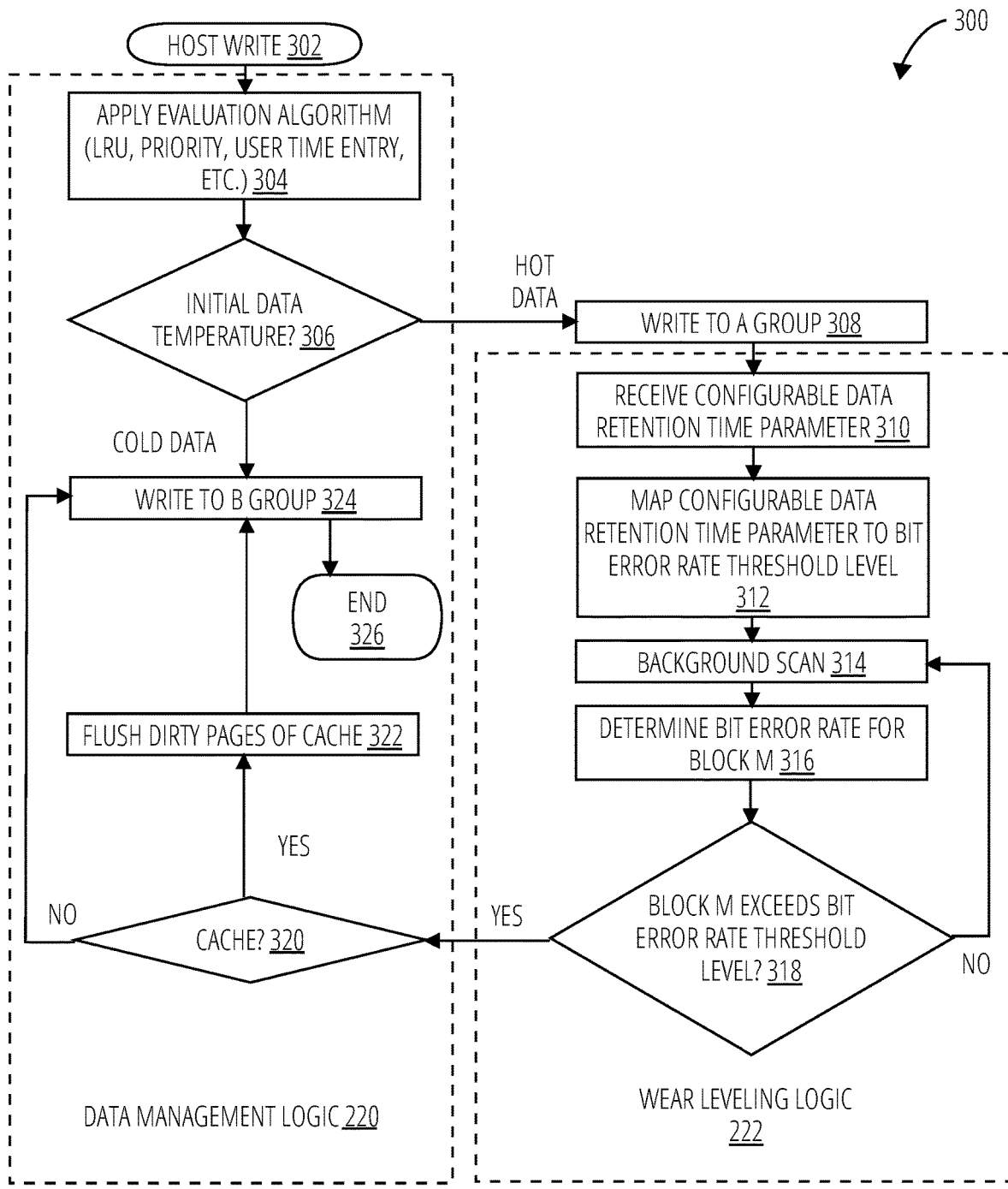
FIG. 3 illustrates a memory migration process with cache 300 in accordance with one embodiment.
Figure 4:
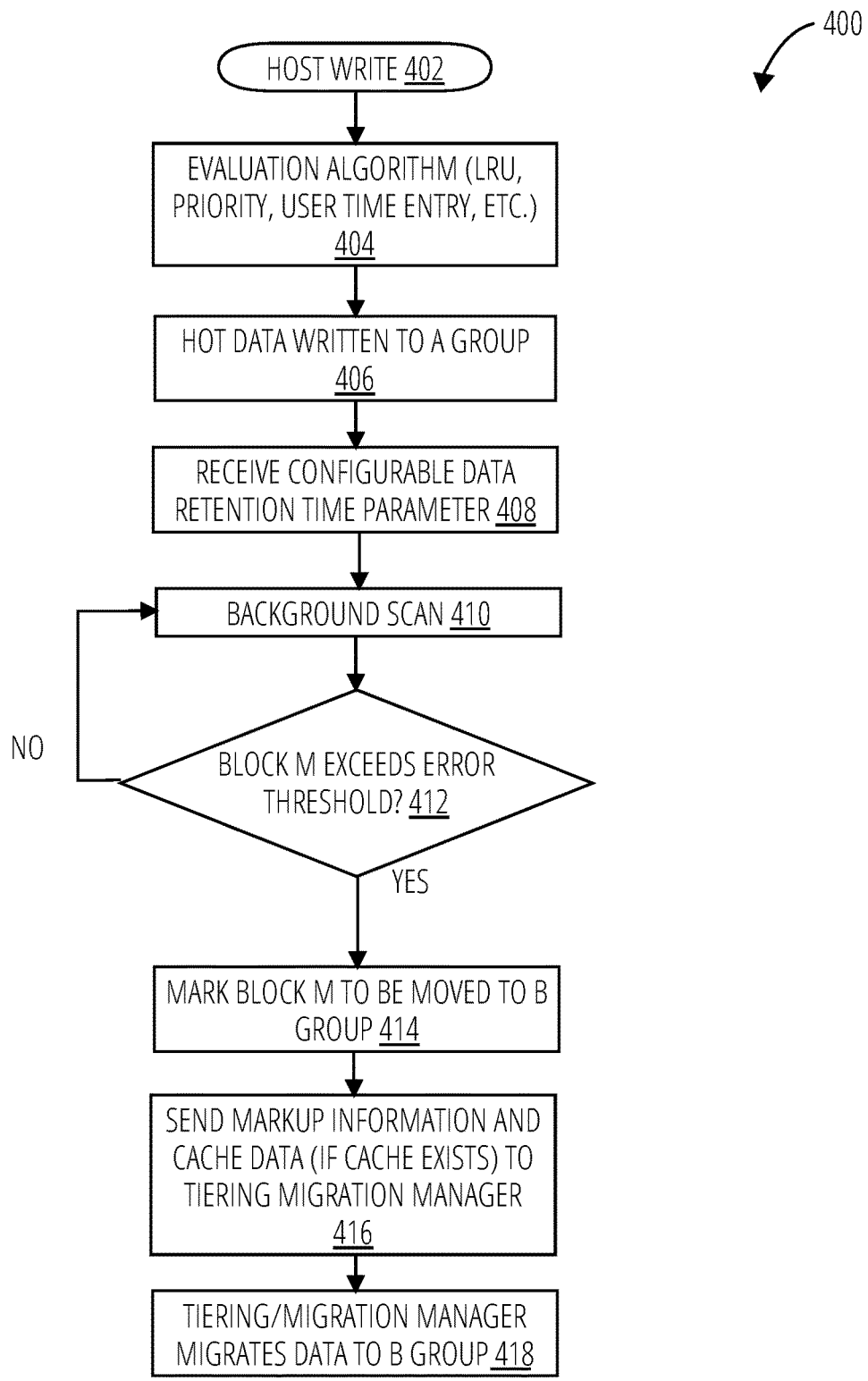
FIG. 4 illustrates a memory migration process with tiering/migration manager 400 in accordance with one embodiment.

The hybrid storage system 100 may be operated in accordance with the processes depicted in FIG. 2, FIG. 3, and FIG. 4.

Referring to FIG. 2, a memory migration process 200 executes a host write (start block 202). Data may be sent to a memory storage array that comprises an A group memory storage array and a B group memory storage array. Each group may be configured for different characteristics, such as data transfer speed, storage duration, etc. An evaluation algorithm is applied (block 204). The evaluation algorithm may be an LRU, a priority, a user time entry, etc., and part of the data management logic 220. The evaluation algorithm is utilized to determine the initial data temperature of the data to be stored during the host write. The memory migration process 200 then acts according to whether the data is determined to hot data or not (decision block 206).

If the data is hot data, a configurable data retention time parameter is applied (block 208). The configurable data retention time parameter may be provided during from a configuration or management application as a user input, or as an input from a machine learning component, or obtained in other ways. The initial determination that data is hot data may be overruled by the configurable data retention time parameter for the data, the bit error rate for the data as reported by the memory media scanning logic for the A group, or a combination of these.

The configurable data retention time parameter may be correlated to a bit error rate threshold level. Such a correlation may be made utilizing a LUT that stores bit error rate threshold levels as a function of the configurable data retention time parameter. A background scan is performed (block 212). The background scan may be performed by memory media scanning logic such as wear leveling logic 222. The memory media scanning logic may return a bit error rate for each block, M, in the A group. The memory migration process 200 then determines whether the bit error rate for each block M exceeds bit error rate threshold level (decision block 214) for the block or the threshold level associated with the configurable data retention time parameter.

Although illustrated in the hot data path, the background scan may be performed periodically or on some other schedule, in the background (e.g., when there are not active reads and writes to the blocks). An initial determination that data is hot data may be overruled by the configurable data retention time parameter for the data, the bit error rate for the data as reported by the memory media scanning logic for the A group, or a combination of these. In one embodiment the background scan may be performed about every five (5) seconds.

If the bit error rate of a block M exceeds the bit error rate threshold level corresponding to the configurable data retention time parameter, or if the block M is just older than the time indicated in the configurable data retention time parameter, the data in those blocks are migrated to the B group (block 210) by the data management logic 220, even though the data was originally determined to be hot data by an evaluation algorithm such as LRU. The data may be written to the A group (block 216) if it is finally determined to be hot data. The data may also be written to the B group if the evaluation algorithm determined that the initial data was cold data (or less active data). The memory migration process 200 then ends (done block 218).

In one embodiment, a data retention time may be set, for example, over a host device interface by a user and be utilized as a criterion for moving data from the A group to the B group. In another embodiment, the configurable data retention time parameter may be learned over time by machine learning logic 224 in manner known in the art. The user may select a time period to determine another threshold at which hot data becomes cold data. Data in the A group with a lower data retention time may be moved to the B group sooner than data in the A group exhibiting the same bit error rate but having a higher data retention time. Thus, the memory blocks of the A group may be freed up faster for new, hot data. Data with higher data retention time, on the other hand, may be maintained in the A group longer than data with a lower data retention time. Thus, this data may take longer to be classified as cold data.

Depending on the embodiment, the wear leveling logic 222 for a particular device (e.g., the device storing the A group data) may be implemented in a controller that is local to that storage device. The data management logic 220 may be implemented in a central controller for the storage system. In other embodiments both or substantial portions of the data management logic 220 and wear leveling logic 222 are implemented in the central controller. The distribution of the data management logic 220 and wear leveling logic 222 among devices will be implementation specific.

Referring to FIG. 3, a memory migration process with cache 300 executes a host write (start block 302). Data may be sent to a memory storage array that comprises an A group memory storage array and a B group memory storage array. Each group may be configured for different characteristics, such as data transfer speed, storage duration, etc. An evaluation algorithm is applied (block 304). The evaluation algorithm may be an LRU, a priority, a user time entry, etc. The evaluation algorithm is utilized to determine the initial data temperature of the data, e.g., hot data or cold data, to be stored during the host write. The memory migration process with cache 300 then determines whether the data is hot data, or active data (decision block 306). If the data is hot data, the data is written to the A group memory storage array (block 308).

A configurable data retention time parameter is received (block 310). The configurable data retention time parameter may be received as a user input, an input from a machine learning component, etc. The configurable data retention time parameter is mapped to a bit error rate threshold level (block 312). The correlation may be made utilizing a LUT that stores bit error rate threshold levels as a function of the configurable data retention time parameter. A background scan is performed (block 314). The memory media scanning logic returns a bit error rate for each block, M, in the A group (block 316). The memory migration process with cache 300 then determines whether the bit error rate for each block M exceeds bit error rate threshold level (decision block 318). The background scan may be performed periodically. For example, a background scan may be performed about every five (5) seconds.

If the bit error rate of a block M exceeds the bit error rate threshold level, the memory migration process with cache 300 determines whether there is a cache (decision block 320) with unwritten data for the block M. The dirty pages of cache are flushed for the block M (block 322). These dirty pages may be flushed prior to migrating the data from the A group to the B group. This may ensure that the data is updated prior to transfer based on actions performed on the data in the cache. Once the cache is flushed or if there was no cache, the data in those blocks, M, are written to the B group (block 324). The initial data may also be written to the B group if the evaluation algorithm determined that the initial data was cold data (or less active data). The memory migration process memory migration process with cache 300 then ends (done block 326).

In one embodiment, a data retention time may be set, for example, by a user and be utilized as a criterion for moving data from the A group to the B group. The user may select a time period to determine another threshold at which hot data becomes cold data regardless of data activity. Data in the A group with a lower data retention time may be moved to the B group sooner than data in the A group exhibiting the same bit error rate but having a higher data retention time. Thus, the memory blocks of the A group may be freed up faster for new, hot data. Data with higher data retention time, on the other hand, may be maintained in the A group longer than data with a lower data retention time. Thus, this data may take longer to be classified as cold data.

Referring now to FIG. 4, a memory migration process with tiering/migration manager 400 executes a host write (start block 402). Data may be sent to a memory storage array that comprises an A group memory storage array and a B group memory storage array. Each group may be configured for different characteristics, such as data transfer speed, storage duration, etc. An evaluation algorithm is applied (block 404). The evaluation algorithm may be an LRU, a priority, a user time entry, etc. The evaluation algorithm is utilized to determine the initial data temperature of the data, e.g., hot data or cold data, to be stored during the host write. Hot data is written to the A group (block 406). A configurable data retention time parameter is received (block 408). The configurable data retention time parameter may be received as a user input, an input from a machine learning component, etc. The configurable data retention time parameter may be mapped to the bit error rate threshold level. The configurable data retention time parameter may be correlated to a bit error rate threshold level. Such a correlation may be made utilizing a LUT that stores bit error rate threshold levels as a function of the configurable data retention time parameter. A background scan is performed (block 410). The background scan may be performed by memory media scanning logic. Such memory media scanning logic may be already performed for functions including wear leveling. The memory media scanning logic returns a bit error rate for each block, M, in the A group. The memory migration process with tiering/migration manager 400 then determines whether the bit error rate for each block M exceeds bit error rate threshold level (decision block 412). If not, the background scan is re-performed. The background scan may be performed periodically. For example, a background scan may be performed about every five (5) seconds.

If the bit error rate of a block M exceeds the bit error rate threshold level, each block M is marked to be moved to B group (block 414). The markup information and cache data (if cache exists) is sent to a tiering/migration manager (block 416). The cache may have unwritten data for the block M. The dirty pages of cache may be flushed for the block M or prepared to be flushed based on the actions of the tiering/migration manager. The tiering/migration manager may utilize the markup information and the cache data to determine whether to migrate each block M to the B group. The tiering/migration manager may utilize other information to help determine whether to migrate the block M to the B group. The markup information is utilized as a new input/hint to the existed tiering algorithm such that the existed algorithm may execute decision making with global optimization. In this case, the over retention data in the A group may have a delay before being migrated, depending on the existed tiering algorithm. Once the tiering/migration manager determines to migrate the block M, the tiering/migration manager migrates the data to B group (block 418).

In one embodiment, a data retention time may be set, for example, by a user and be utilized as a criterion for moving data from the A group to the B group. The user may select a time period to determine another threshold at which hot data becomes cold data. Data in the A group with a lower data retention time may be moved to the B group sooner than data in the A group exhibiting the same bit error rate but having a higher data retention time. Thus, the memory blocks of the A group may be freed up faster for new, hot data. Data with higher data retention time, on the other hand, may be maintained in the A group longer than data with a lower data retention time. Thus, this data may take longer to be classified as cold data. The data retention time may be further utilized as a hint/input to the tiering/migration manager.

Referring to FIG. 5, a solid state drive 500 comprises a host device interface 502, a controller 504, a FLASH memory (A group) 506, a FLASH memory (B group) 510, and a DRAM 540. The controller 504 may include a command/data input path 518, a serializer 520, a flash interface 522, a volatile memory buffer 524, a data output path 526, a cache/prefetch, etc. 528, a RAID 530, a bad block manager 532, a garbage collection 534, a wear leveling 536, a DRAM controller 538, accelerators 542, a micro-controller unit 544, an SRAM 546, and peripherals 548. The FLASH memory (A group) 506 may include a NAND gate group 508. The FLASH memory (B group) 510 may include a NAND gate group 512; a NAND gate group 514, and a NAND gate group 516. The solid state drive 500 is thus an example of an embodiment in which a central controller 504 implements the data management logic 220 and the wear leveling logic 222. As previously noted, in other embodiments the data management logic 220 may be in a separate device and the solid state drive 500 may comprise a "thin" controller that implements, for example, all or portions of the wear leveling logic 222.

The controller 504 may have a one ASIC or two-chip architecture (front end chip and backend chip) with proper function partitioning.

The FLASH memory (A group) 506 and the FLASH memory (B group) 510 may receive processed data from the flash interface 522 and return a data output. The FLASH memory (A group) 506 and the FLASH memory (B group) 510 may include logic to determine which of the NAND gate groups to utilize to generate the data outputs, which are sent to the flash interface 522. Data may be transferred from the FLASH memory (A group) 506 to the FLASH memory (B group) 510 based on the data temperature of the data in the FLASH memory (A group) 506 via the flash interface 522. The solid state drive 500 may receive a command (or control signal) at the host device interface 502, which is then received at the command/data input path 518.

The host device interface 502 prioritizes which of the physical layers to utilize during a data or command transfer to the host device. The host device interface 502 may be configured by the data output path 526 regarding delays in sending and reporting sent and received data and commands. The host device interface 502 further sends incoming data for NAND processing to the command/data input path 518.

The command/data input path 518 receives data for NAND processing from the host device interface 502. The data is then sent to a serializer 520. The command/data input path 518 further sends control signals regarding workload to a latency estimate logic. The workload attributes may include percentage read, a queue depth, a percentage random, a transfer length, an initiator count, a port count, and input/outputs per second (TOPS).

The serializer 520 receives the data from the command/data input path 518. The serializer 520 performs the process of translating data structures or object state into a format that can be stored (for example, in a file or memory buffer) or transmitted (for example, across a network connection link) and reconstructed later (possibly in a different computer environment). Such a control signal may influence the flash translation layer queue depth. The processed data is then sent to the flash interface 522. In some embodiments, the processed data alters the flash translation layer queue depth of the flash interface 522, altering the number of commands the flash interface 522 is concurrently processing.

The flash interface 522 receives the processed data as well as the control signal to determine the flash translation layer queue depth. The flash interface 522 may interact via control signals to determine the address to send data and commands to the FLASH memory (A group) 506 and the volatile memory buffer 524. The flash interface 522 may then send data and commands to the FLASH memory (A group) 506, the FLASH memory (B group) 510, and the volatile memory buffer 524. The flash interface 522 also receives the data outputs from the FLASH memory (A group) 506.

An indirection table stores address locations for various components of the solid state drive 500 to be utilized by the flash interface 522.

The volatile memory buffer 524 may send and receive data (processed data, data outputs, etc.) from the flash interface 522 and the data output path 526. The volatile memory buffer 524 is a region of a physical memory storage used to temporarily store data while it is being moved from one place to another. For example, the volatile memory buffer 524 may store processed data that is not actively queued in the flash interface 522 and send further processed data upon request by the flash interface 522. The flash interface 522 may perform a similar process for data outputs for the data output path 526.

The data output path 526 determines the scheduling of host device data transfers (e.g., of data outputs) and the scheduling of host device responses. The data output path 526 communicates with the host device interface 502 to send and receive this data and commands. The data output path 526 may be altered by the control signals to delay the data transfers or the response frames. The data output path 526 may send control signals regarding workload to a latency estimate logic. The workload attributes may include percentage read, a queue depth, a percentage random, a transfer length, an initiator count, a port count, and input/outputs per second (IOPS).

The cache/prefetch, etc. 528, the RAID 530, the bad block manager 532, the garbage collection 534, and the wear leveling 536 are firmware stored in the controller 504. This firmware may perform various operations on the solid state drive 500. The hybrid storage system 100 may for example utilize the wear leveling 536 to determine the bit error rate of data stored in the FLASH memory (A group) 506 and the FLASH memory (B group) 510. The DRAM controller 538, the accelerators 542, the micro-controller unit 544, the SRAM 546, and the peripherals 548 may be part of an application-specific integrated circuit (ASIC) on the controller 504 designed for a special application, such as a particular kind of transmission protocol or a hand-held computer. The DRAM controller 538 may interface with the DRAM 540.

Referring to FIG. 6, a hard disk drive 600 comprises a media disk 602, a disk motor 604, a disk head 606, a disk head control 608, a motor controller 610, a preamplifier 618, a hard disk controller 612, a processor 620, a read/write channel 616, and a host device interface 614. The hard disk drive 600 is an example of a device that may act as a B group memory storage array 108, e.g., hard disk drive 112.

The hard disk drive 600 records data by magnetizing the media disk 602. The media disk 602 may include a thin film of ferromagnetic material. Sequential changes in the direction of magnetization represent binary data bits. The data is read from the media disk 602 by detecting the transitions in magnetization. User data is encoded using an encoding scheme, such as run-length limited encoding, which determines how the data is represented by the magnetic transitions. The media disk 602 may include one or more platters that are spun by the disk motor 604. The platters may be spun at speeds varying from, for example about 4,200 rpm in energy-efficient portable devices, to about 15,000 rpm for high-performance servers.

Information is written to and read from a platter as it rotates past devices called read-and-write heads (i.e., the disk head 606) that are positioned by the disk head control 608 to operate very close to the magnetic surface, with their flying height often in the range of about tens of nanometers. The read-and-write disk head 606 is used to detect and modify the magnetization of the material passing immediately under it.

There may be one head for each magnetic platter surface on the spindle, mounted on a common arm. An actuator arm (or access arm) moves the disk head 606 on an arc (roughly radially) across the platters as they spin, allowing each disk head 606 to access almost the entire surface of the platter as it spins.

The hard disk drive 600 may have two electric motors; a spindle motor (the disk motor 604) that spins the disks and an actuator (the disk head control 608) that positions the read/write head assembly across the spinning disks. The disk motor 604 may include an external rotor attached to the disks; the stator windings may be fixed in place. Opposite the disk head control 608 at the end of the head support arm is the read-write disk head 606; thin printed-circuit cables connect the read-write disk head 606 to amplifier electronics mounted at the pivot of the actuator. Each of the disk motor 604 and the disk head control 608 are controlled by the motor controller 610 to synchronize operations during a read or a write to the media disk 602. The motor controller 610 is further operated by the hard disk controller 612 to coordinate reads/writes to the media disk 602.

Data is stored on the media disk 602 in a series of logical blocks. Each block is delimited by markers identifying its start and end, error detecting and correcting information, and space between blocks to allow for minor timing variations. These blocks often contained 512 bytes of usable data, but other sizes have been used. The commands may be received or transmitted by the host device interface 614. The host device interface 614 may receive read or write commands. Write commands may include the data to be written. The host device interface 614 may transmit the data that is read from the media disk 602. The read/write channel 616 sends the data to be read or written to the host device interface 614 or the preamplifier 618. The preamplifier 618 is a chip, which helps control heads and amplifies signals from/to them. The processor 620 may store and utilize firmware to perform functions on the data stored on the media disk 602, as well as storing protocols for the host device interface 614.

The hard disk drive 600 may be utilized by the hybrid storage system 100 to store cold data. The cold data is received at the host device interface 614. The read/write channel 616 and the preamplifier 618 send the data signal to the media disk 602. The data is further stored by the operation of the disk motor 604 and the disk head 606 to select a location for the data, as controlled by the disk head control 608, the motor controller 610, and the hard disk controller 612.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to indicate machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A hybrid storage system comprising:
a first memory device;
a second memory device;
memory media scanning logic configured to periodically sample a bit error rate of memory blocks of the first memory device;
data management logic configured to:
apply an evaluation algorithm to determine an initial data temperature selected from hot data and cold data;
write hot data blocks to the first memory device; and
write cold data blocks to the second memory device; and
a wear leveling logic in the first memory device configured to:
determine a configurable data retention time parameter for the first memory device, wherein the configurable data retention time parameter corresponds to a defined time period for moving data blocks from the first memory device to the second memory device;
map the configurable data retention time parameter to a bit error rate threshold level; and
redirect, responsive to the memory media scanning logic generating an indication that the bit error rate matches the bit error rate threshold level, a write of a hot data block from the first memory device to the second memory device.

2. The hybrid storage system of claim 1, wherein:
the first memory device is a solid state drive; and
the second memory device is a hard disk drive.

3. The hybrid storage system of claim 1, wherein:
the first memory device is a first solid state drive; and
the second memory device is a second solid state drive having a higher latency and higher capacity than the first solid state drive.

4. The hybrid storage system of claim 1, wherein the memory media scanning logic comprises static wear leveling logic.

5. The hybrid storage system of claim 1, wherein:
the memory media scanning logic is implemented on a local controller of the first memory device; and
the data management logic is implemented on a central controller for the first memory device and the second memory device.

6. The hybrid storage system of claim 1, wherein:
the first memory device is a solid state drive; and
the data management logic, the wear leveling logic, and the memory media scanning logic are implemented by a controller of the solid state drive.

7. The hybrid storage system of claim 1, wherein the configurable data retention time parameter is correlated to the bit error rate threshold level in a memory lookup table.

8. The hybrid storage system of claim 7, further comprising a host device interface configured to receive the configurable data retention time parameter from a host device.

9. The hybrid storage system of claim 1, wherein the configurable data retention time parameter is generated by machine learning logic.

10. The hybrid storage system of claim 1, wherein:
the memory media scanning logic comprises the wear leveling logic; and
the wear leveling logic is configured to:
apply the configurable data retention time parameter and the bit error rate to overrule the determination by the evaluation algorithm that the initial data temperature of the hot data block is hot data; and
initiate a memory migration process by the data management logic to redirect the write of the hot data block to the second memory device.

11. A hybrid storage system comprising:
a first memory device;
a second memory device having different data storage characteristics than the first memory device;
means in the first memory device to periodically sample a bit error rate of the first memory device;
means to apply an evaluation algorithm to determine an initial data temperature selected from hot data and cold data;
means to write hot data blocks to the first memory device;
means to write cold data blocks to the second memory device;
means to determine a configurable data retention time parameter for the first memory device, wherein the configurable data retention time parameter corresponds to a defined time period for moving data blocks from the first memory device to the second memory device;
means to map the configurable data retention time parameter to a bit error rate threshold level; and
means to move, responsive to the bit error rate meeting or exceeding the bit error rate threshold level, hot data blocks from the first memory device to the second memory device.

12. The hybrid storage system of claim 11, further comprising means to apply the bit error rate and the configurable data retention time parameter to overrule the determination of the initial data temperature as hot data.

13. A computer-implemented method comprising:
applying an evaluation algorithm to determine an initial data temperature selected from hot data and cold data;
writing hot data blocks to a first memory device;
writing cold data blocks to a second memory device;

determining a configurable data retention time parameter for the first memory device, wherein the configurable data retention time parameter is a defined time period for moving data blocks from the first memory device to the second memory device;

mapping the configurable data retention time parameter to a bit error rate threshold level;

periodically sampling, by the first memory device, a bit error rate of memory blocks of the first memory device;

comparing, for a hot data block, the sampled bit error rate to the bit error rate threshold level; and redirecting, responsive to the sampled bit error rate exceeding the bit error rate threshold level, a write of the hot data block from the first memory device to the second memory device.

14. The computer-implemented method of claim 13, further comprising:

receiving the configurable data retention time parameter from a user input, wherein the configurable data retention time parameter is a user-defined time period for moving data blocks from the first memory device to the second memory device.

15. The computer-implemented method of claim 13, further comprising:

receiving the configurable data retention time parameter from a machine learning component.

16. The computer-implemented method of claim 13, wherein mapping the configurable data retention time parameter to the bit error rate threshold level uses a lookup table that stores bit error rate threshold levels as a function of the configurable data retention time parameter.

17. The computer-implemented method of claim 13, further comprising:

marking, responsive to the sampled bit error rate exceeding the bit error rate threshold level, the hot data block to be moved to the second memory device; and moving, the hot data block to the second memory device.

18. The computer-implemented method of claim 17, further comprising:

checking, responsive to marking the hot data block to be moved, cache data for the hot data block; and flushing the cache data for the hot data block to the second memory device.

19. The computer-implemented method of claim 17, wherein comparing the sampled bit error rate to the bit error rate threshold level overrules the configurable data retention time parameter for marking the hot data block to be moved to the second memory device.

20. The computer-implemented method of claim 13, further comprising:

applying the configurable data retention time parameter and the sampled bit error rate to overrule the determination by the evaluation algorithm that the initial data temperature of the hot data block is hot data; and initiating a memory migration process to redirect the write of the hot data block to the second memory device.

* * * * *